United States Patent [19]
Paul

[11] Patent Number: 4,916,896
[45] Date of Patent: Apr. 17, 1990

[54] MULTIPLE PROPULSION WITH QUATRO VECTORIAL DIRECTION SYSTEM

[76] Inventor: Marius A. Paul, 1100 E. Orangethorpe Ave., Ste. 140, Anaheim, Calif. 92801

[21] Appl. No.: 266,013

[22] Filed: Nov. 2, 1988

[51] Int. Cl.$^4$ .............................................. F02K 11/00
[52] U.S. Cl. ..................... 60/244; 60/39.33
[58] Field of Search ............... 60/39.33, 244, 245, 60/270.1, 257

[56] References Cited
U.S. PATENT DOCUMENTS

| | | |
|---|---|---|
| 3,161,018 | 12/1964 | Sandre . |
| 3,199,291 | 8/1965 | Kelley et al. .................... 60/244 |
| 3,229,459 | 1/1966 | Cervenka .................... 60/244 |
| 3,238,716 | 8/1966 | Sandre . |
| 3,395,539 | 8/1968 | Gozlan .................... 60/244 |
| 3,548,597 | 12/1970 | Etessam . |
| 3,635,029 | 1/1972 | Menloux . |
| 3,740,949 | 6/1973 | Wolfe et al. . |
| 3,747,339 | 7/1973 | Wolfe et al. . |
| 3,834,161 | 9/1974 | Quigley, Jr. et al. ............ 60/244 |
| 4,010,608 | 3/1977 | Simmons . |
| 4,054,030 | 10/1977 | Pedersen .................... 60/39.33 |
| 4,175,384 | 11/1979 | Wagenknecht et al. . |

FOREIGN PATENT DOCUMENTS

WO85/00199  1/1985  PCT Int'l Appl. .
2118248  10/1983  United Kingdom ............... 60/39.33

*Primary Examiner*—Donald E. Stout
*Attorney, Agent, or Firm*—Bielen, Peterson & Lampe

[57] ABSTRACT

A compact, multimode propulsion system for aerial vehicles having multiple thermal cycles for selective independent or integrated operation in multiple modes to enable the propelled vehicle to operate in a full range of velocities under a variety of atmospheric conditions and efficiencies, the system including a turbo-jet unit with an air compressor, a gas turbine and an intermediate fuel injected combustor in association with an auxiliary combustor unit that includes a supplemental fuel and selective oxidizer supply, and a conversion system for selectively converting the auxiliary combustion unit into a secondary burner mode for the turbo-jet unit, an independent rocket mode operable with or without the turbo-jet unit or in independent ram-jet mode operable with or without the turbo-jet unit, the turbo-jet unit and auxiliary combustor system having separate exhaust systems for directional mobility of the vehicle to which the propulsion system is applied.

6 Claims, 8 Drawing Sheets

MULTIPLE PROPULSION WITH QUATRO VECTORIAL DIRECTION SYSTEM

BACKGROUND OF THE INVENTION

The evolution of jet engine propulsion systems from subsonic to transonic, supersonic, and hypersonic speed, has been marked by a separate evolution of jet engines including turbo-jets, ram-jets, rockets, and other hybrid derivatives.

Special importance has been given to the military applications of such engines for high supersonic speed, with a marked interest in all other levels of speed, to expand capabilities of aerial vehicles.

Special multi-missions of the cruise missiles which must cover a large range of speeds, altitudes, launching systems, pay-loads, and fuel characteristics resulted in a complex package of major problems, which consistently restricted the achievement of an optimized general and total solution for the variety of desired applications.

A principal object of this invention is to solve these problems and provide a compact multimode propulsion system that will satisfy the requirements of a variety of aerial vehicle applications.

SUMMARY OF THE INVENTION

This invention relates to a multiple thermal cycle propulsion system, which can optimize all the flight conditions, for a large multi-mission propulsion system with special adaptation to high speed supersonic cruise missiles. The level of speed has always been a criteria in the basic solution, but the variation of speed over a large spectrum, was a main limitation and resulted in a separation between specific types of cycles and engine structures, each satisfying some criteria, but none being suitable for all desired speeds and conditions.

This invention, is defined as a thermo-dynamic propulsion system, which is a cohesive synthesis of associated thermal cycles. This synthesis includes individual turbo-jet, ram-jet and rocket cycles with parallel cycles, of turbo-ram jet, and turbo-rocket, and with a combined cycle of dual combustion in one multi-convertible multi-mission engines. The same invention relates to a structure comprising a quatro-vectorial jet directional system, for total mobility in flying vehicles.

Because of the flexible interaction of the various cycles, transitional speeds and various mission applications, a continuous optimization of all flight parameters and performances can be accomplished by an electronic control system under guidance of a microprocessor.

BRIEF DESCRIPTION OF THE DRAWINGS

FIGS. 1.1, 1.2, 1.3, 1.4, 1.5 and 1.6 are schematic configurations of the engine in FIG. 1 in alternate modes of operation.

DETAILED DESCRIPTION OF THE PREFERRED EMBODIMENT

Figure 1:
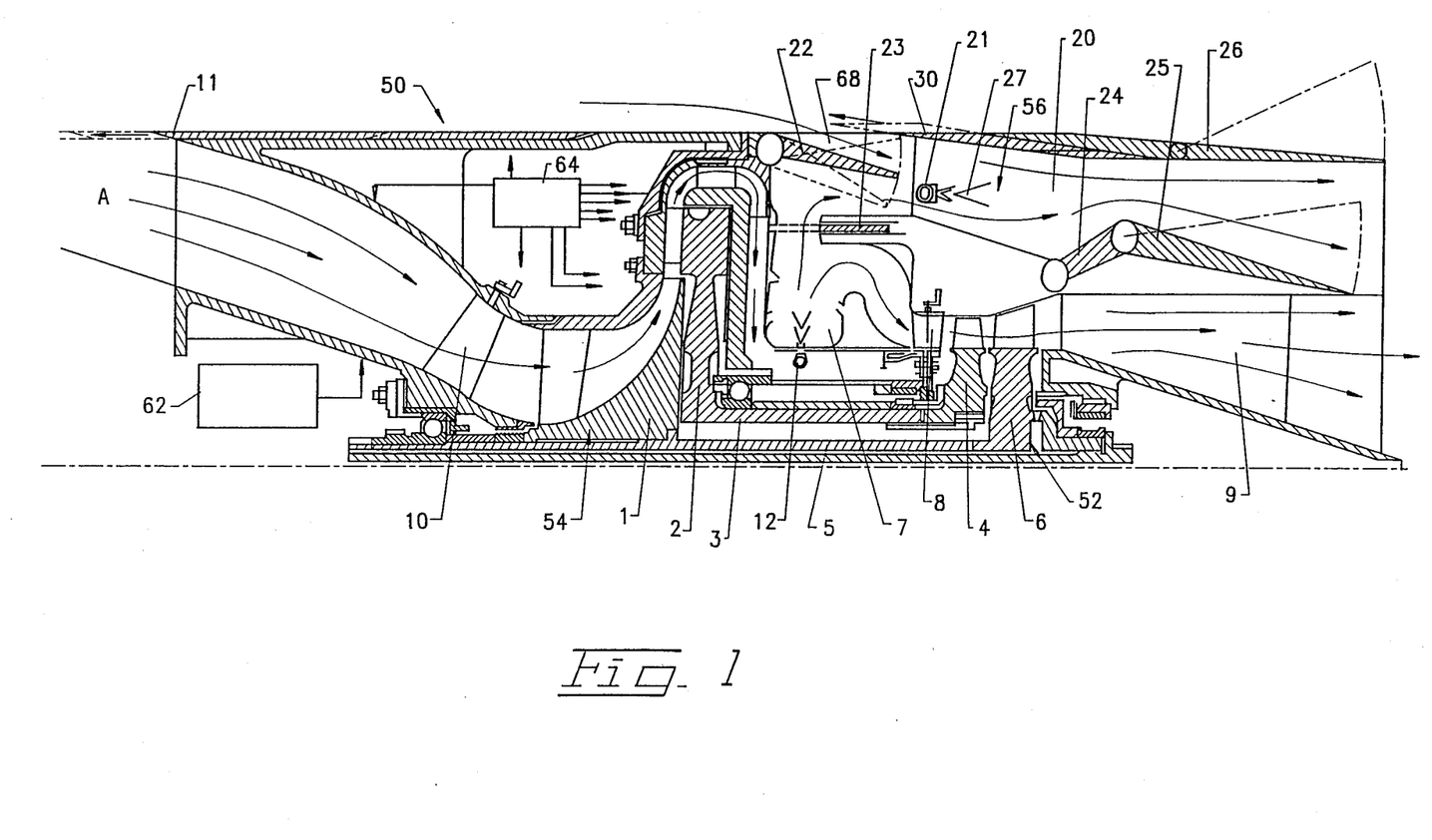
FIG. 1 is a longitudinal half, cross-section of the engine with multiple propulsion cycles utilizing a quatro vectorial directional system.

The engine 50 shown in FIG. 1 integrates a central turbo-jet with a counter-rotating turbo-compression unit 54, incorporating a variable geometry air and gas system, 10 and 8, respectively, with an associated combustor unit 56 that is operable as:

(a) four cross distributed individual rocket engine chambers (FIG. 1.2 and FIG. 1.5);
(b) four cross distributed individual ram-jet engine chambers (FIG. 1.3 and FIG. 1.6); or
(c) four cross distributed individual parallel combustion chambers 62 (FIG. 1.4).

Figure 15:
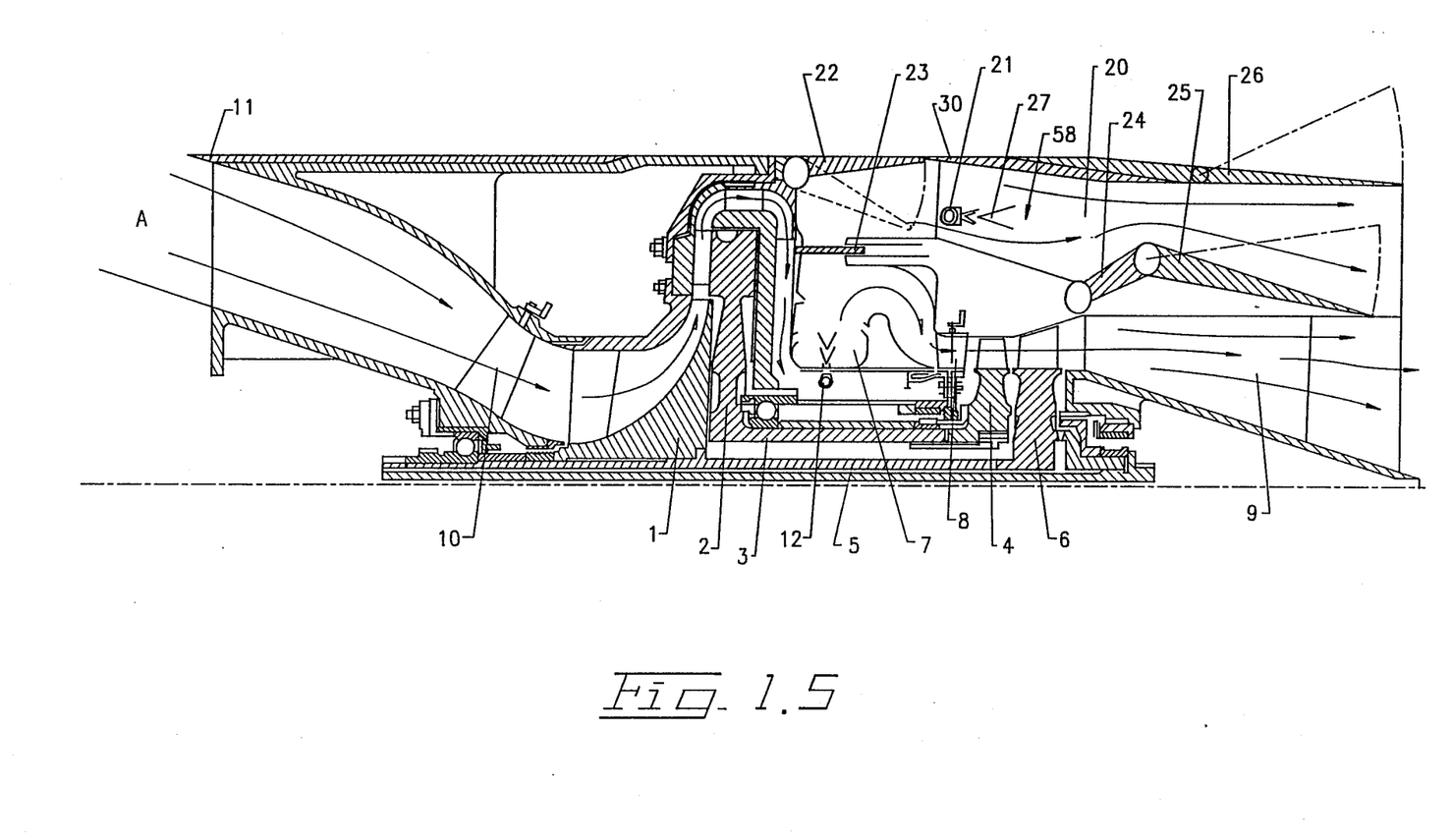
Figure 16:
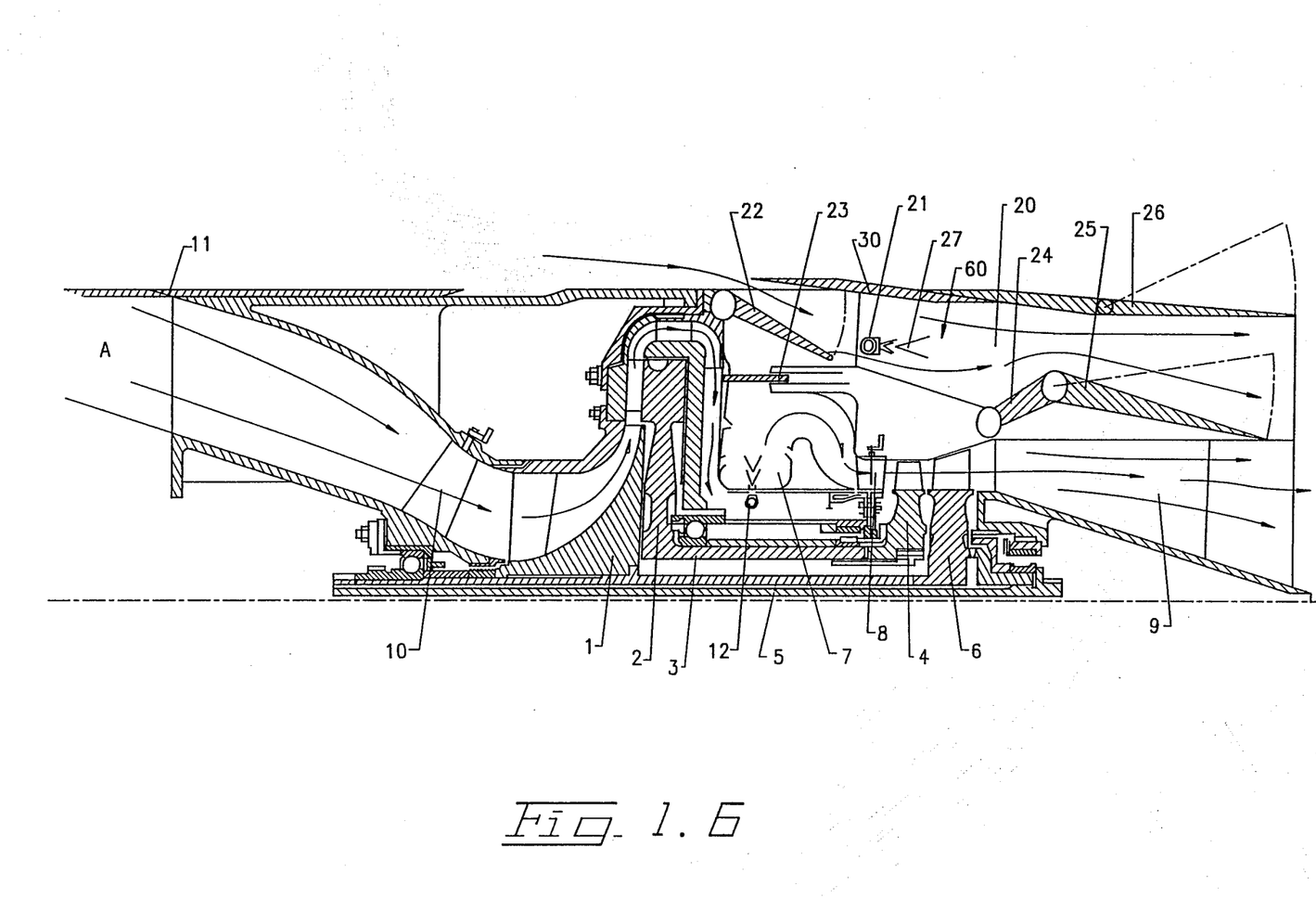

The engine 50 has convertible means to associate:

(a) the turbo-jet unit with the four rocket engine chambers resulting in a turbo plus four rocket engine system as shown in FIG. 1.5;
(b) the turbo-jet with four ram-jets engine chambers resulting in a turbo plus four ram-jets engine system as shown in FIG. 1.6; and
(c) the turbo-jet with the parallel combustion chambers resulting in a turbo plus four parallel combustion system.

Figure 11:
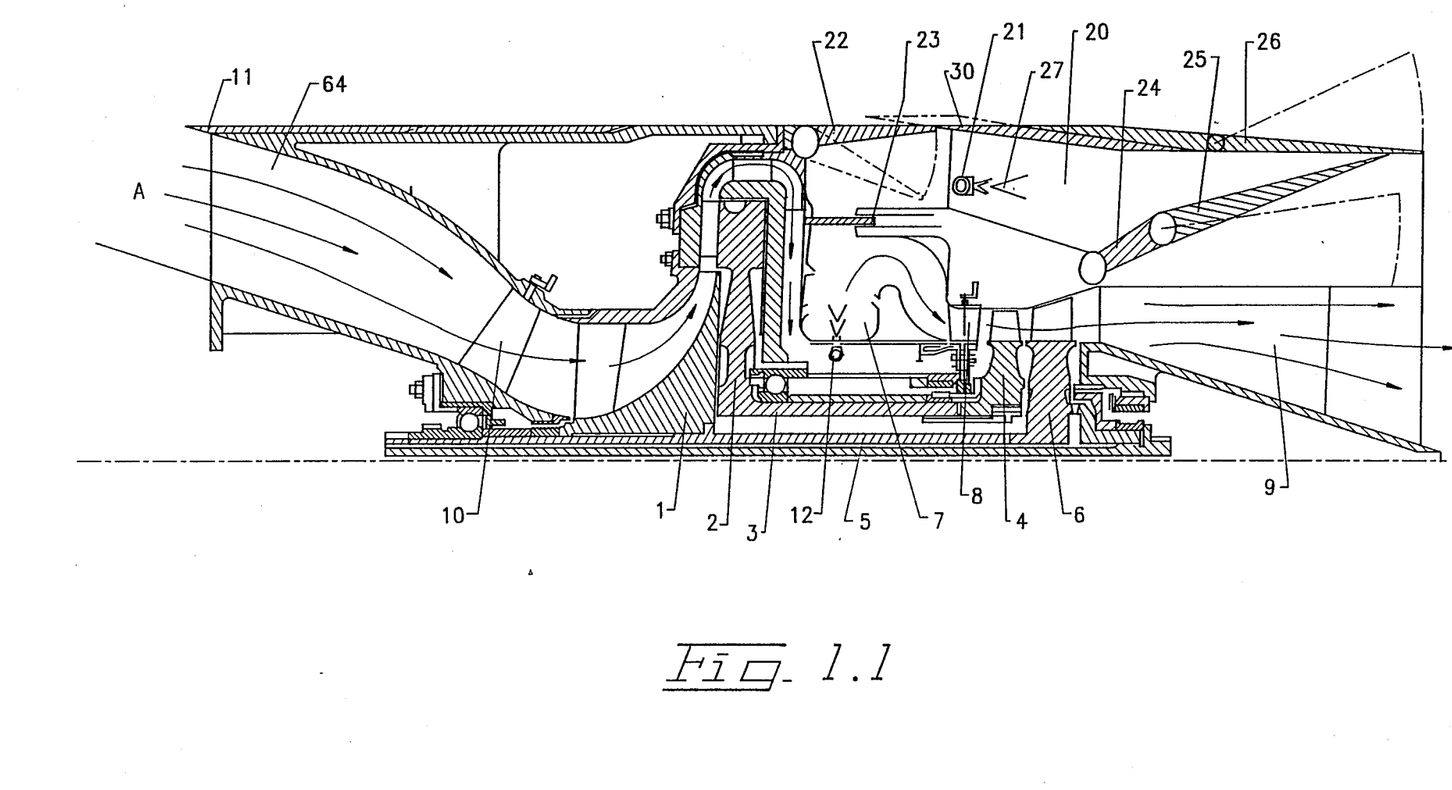
Figure 12:
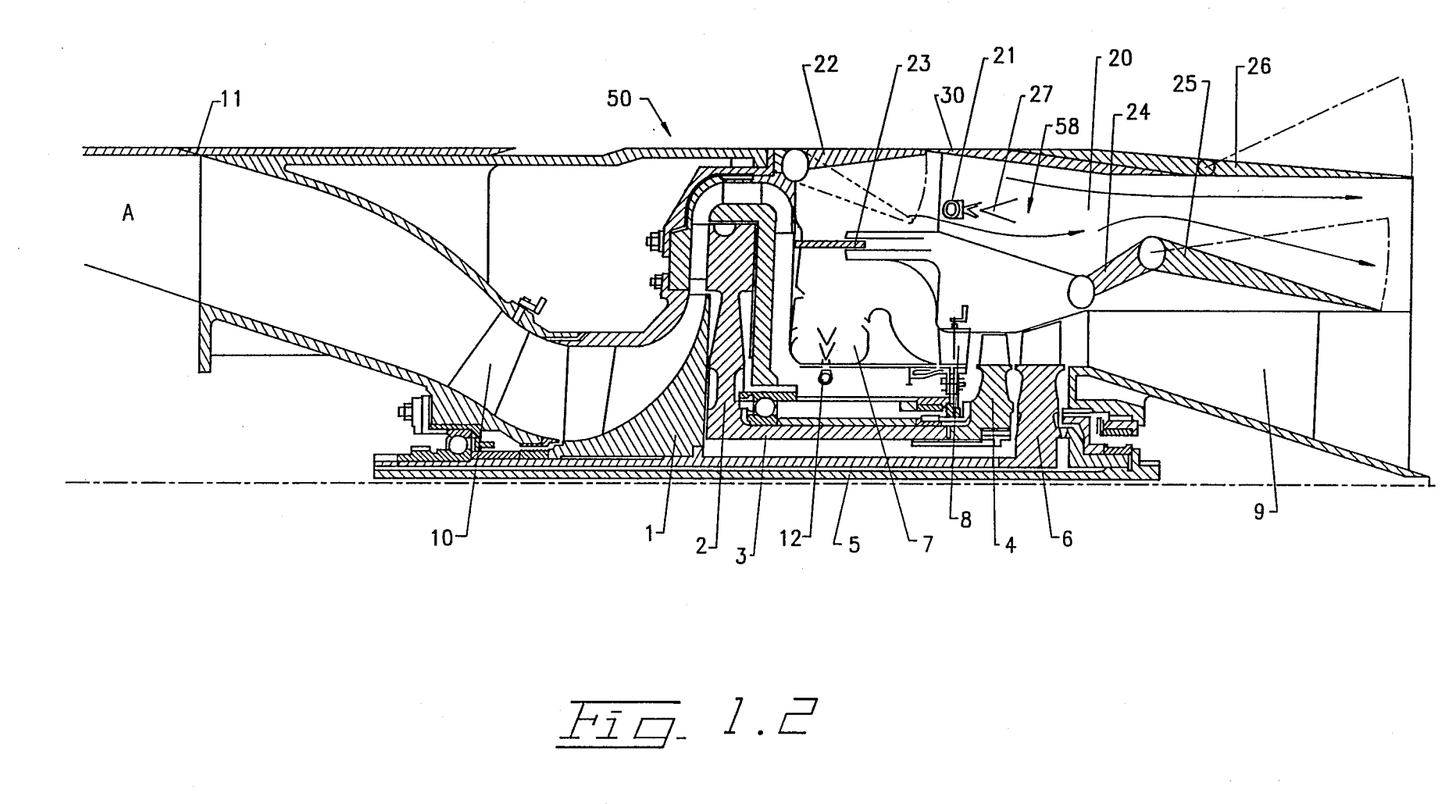
Figure 14:
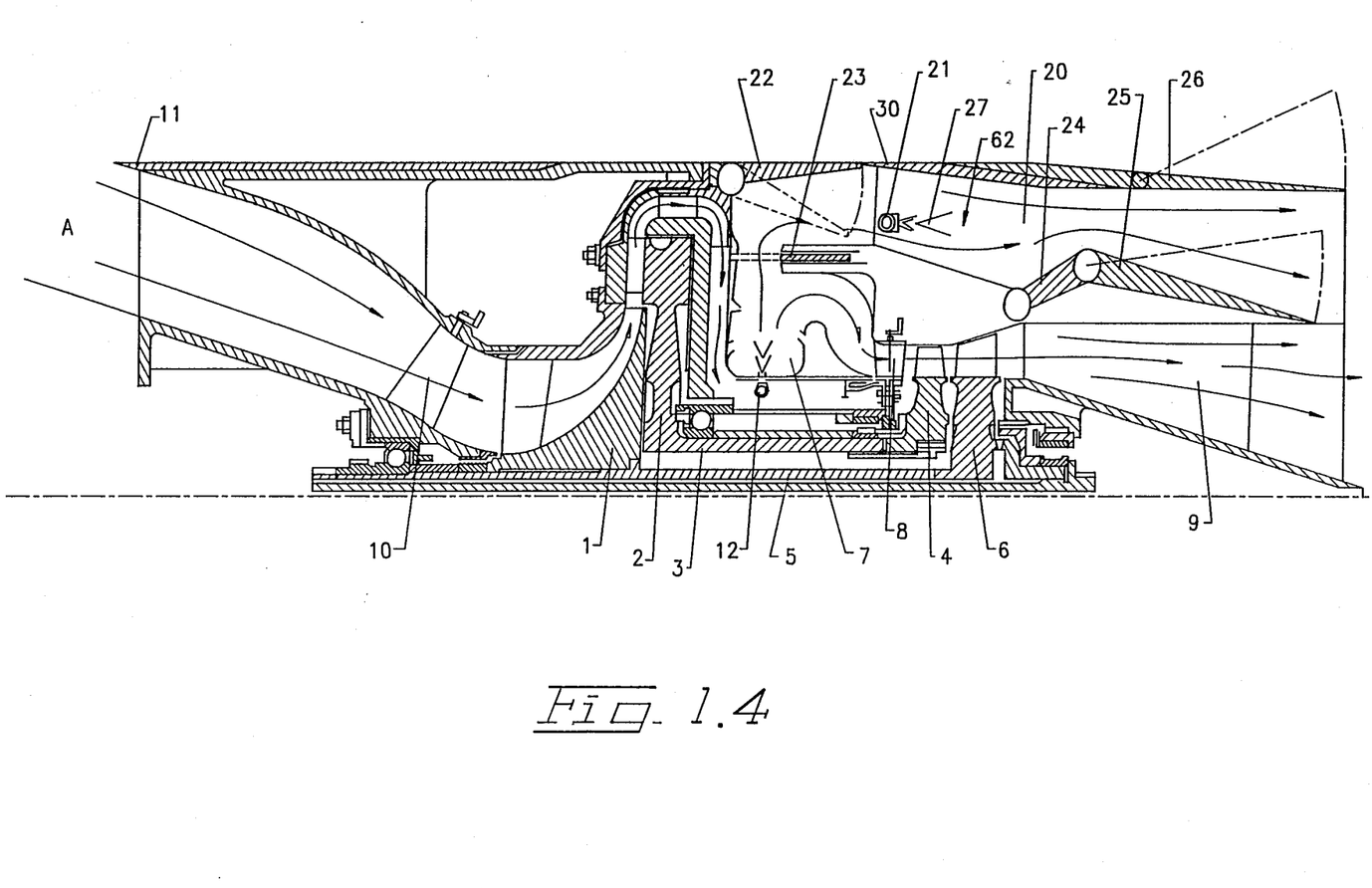

The engine also has control means to selectively operate (a) a turbo-jet as shown in FIG. 1.1;
(b) a four rocket engine, as shown in FIG. 1.2; and
(c) a four ram-jet engine, as shown in FIG. 1.3.

Figure 2:
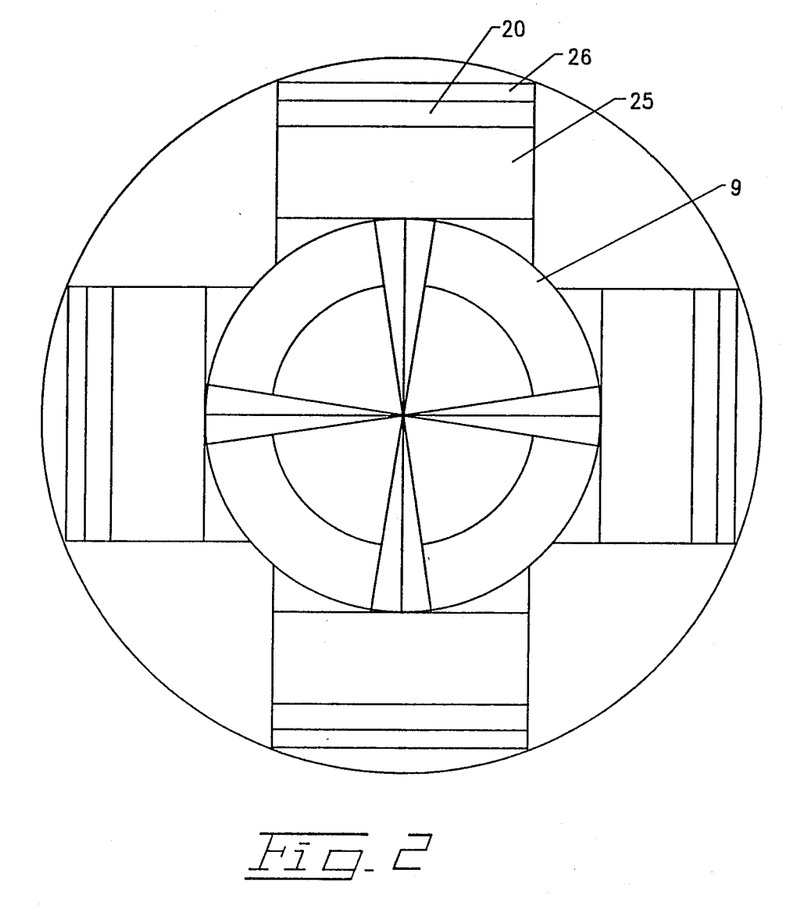
FIG. 2 is a rear view of the engine of FIG. 1 showing the multiple jet, vectorial directional system.
Figure 3:
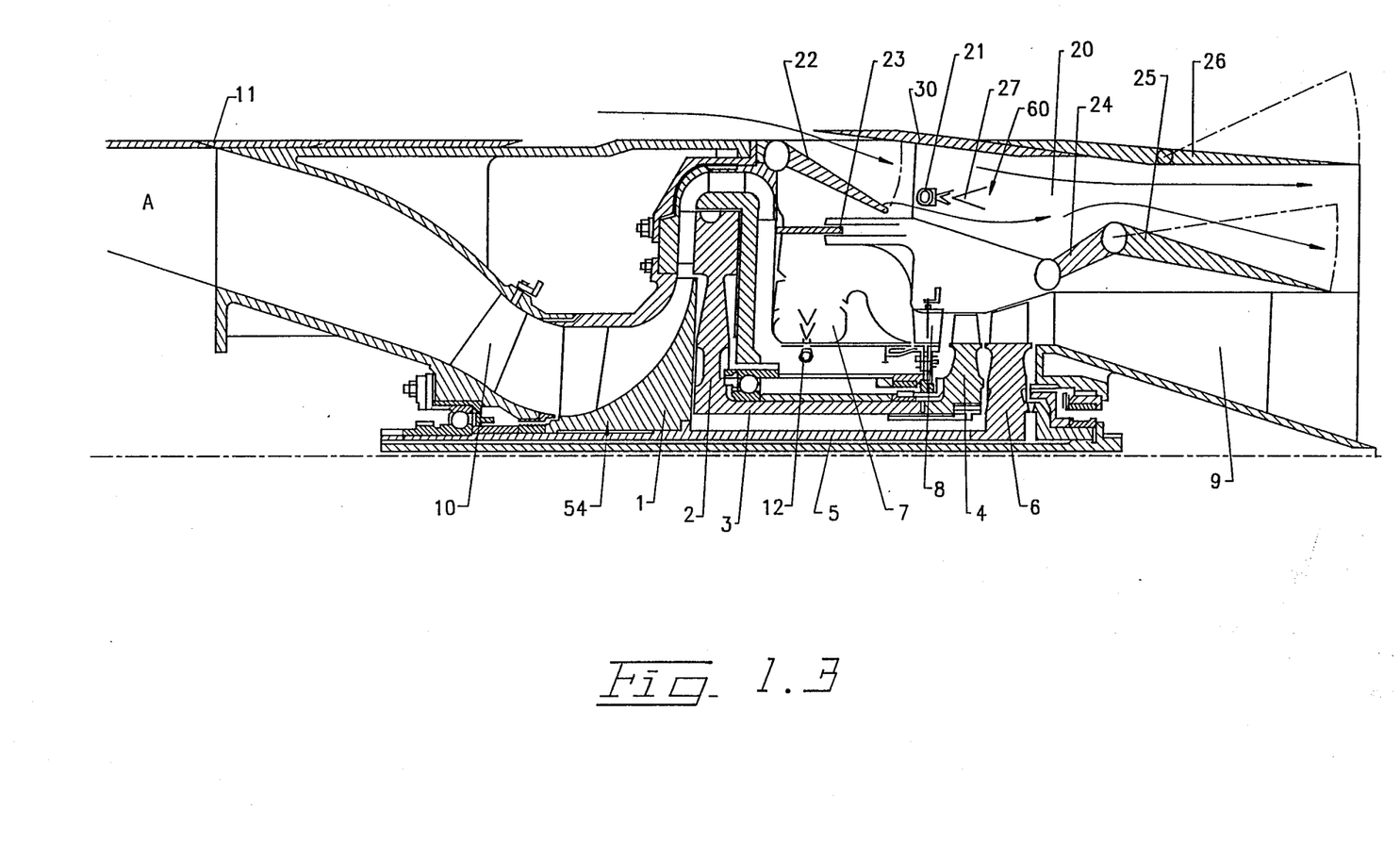

As a special feature of the particular preferred arrangement of the combustor unit 54, the unit is divided in to four individually operated and controlled perimeter chambers arranged around the central turbo-jet unit 54 as shown in FIG. 2. A quatro-vectorial directional system is involved in all the individual or associated modes of operation except the turbo-jet mode of FIG. 1.1, to direct and to adapt the nozzle geometry for thrust or direction for all flight conditions.

The following describes the functional alternatives of the invention where the engine is operated in different modes as controlled by the microprocessor 62 and electronic control system 64 shown schematically in FIG. 1 which connect to the various valve, flap, nozzle and air flow systems in a conventional manner. As a turbo-jet the central turbo-jet unit 52 has counter rotating compressors, including a central rotor 1 and a peripheral rotor 2. The peripheral rotor 2 is connected by a peripheral shaft 3 to a first turbine 4; and the central compressor rotor 2 is connected by a central shaft 5, to the second turbine 6. A central combustion chamber 7 is connected through the variable nozzle 8 to the counter rotating turbines 4 and 6 and the central jet propulsion nozzle 9. The air intake 64 for the central turbo-jet unit 52 is controlled by a variable geometry stator blade system 10, and a sliding valve 11. The fuel injection atomization is produced by multiple-distributed injectors 12. The result is a single central jet propulsion system without auxiliary combustion.

As a rocket the four cross distributed individual rocket engine chambers 58 consist of rectangular square combustion chambers 20, fuel and oxidizer injectors 21, with combustion stabilizers 27, closed flaps 22 closed separation valves 23 and four-directional, vectorial variable, two dimensional, jet deflectors, 24, 25, and 26 for nozzle size control and exhaust jet direction control. The result is a four jet, individual rocket propulsion system.

As a ram-jet the four cross-distributed individual ram-jet chambers 60 are composed from the same items as the rocket chambers, with the addition of an open air supersonic deflector 30. This acts in a correlated position with the flaps 22 to control the volume of air entering the chamber. The variable, two-dimensional jet deflectors 24, 25, and 26, are utilized in the open position to control the jet nozzle size and exhaust discharge direction. Separation valves 23 are positioned in the closed position to isolate the combustion chamber 20 from the turbo-jet chamber 7. The result is a four jet individual ram-jet propulsion system.

As a parallel combustion system the four cross-distributed individual parallel combustors 62 are composed of the same items for the rocket and ram-jet chambers Flaps 22 and the air deflector 30, are utilized in the closed position The separation valves 23 are utilized in the open position permitting the connection between the combustion chamber 7 and the parallel combustion chamber 20. Additional fuel is ejected from the injectors 21 to mix with combustion gases with excess air from the central combustion chamber 7.

The result is the combination of 5 jets in a controlled propulsion system, in which 4 jets are vectorial directed, two dimensional jet systems and one is a permanent central jet propulsion system. The parallel combustion system can also be operated with a ram air assist with separation valves 23 in the open or partially open position, the deflector 30 in the open position and flap 22 regulating the relative flow of combustion gases from combustion chamber 7 and air from ram intake 68. With the excess air, in increased flow of fuel can be ejected from the injectors 21.

As a rocket turbo-jet system the four cross distributed rocket chambers 58 can be associated with the central turbo-jet system, in a 5 propulsion jet system, in which the four rocket jets form an individual or combined directional vectorial two dimensional system, resulting in a maximum thrust jet propulsion system. The separation valve 23 is closed and oxidizer is ejected with the fuel from the injectors 21.

As a turbo ram-jet system the four cross distributed individual ram-jet chambers 60 can be associated with the central turbo-jet system in a 5 propulsion jet system similar to the above described rocket turbo-jet system. The separation valve 23 is closed and only fuel is ejected from the injectors 21.

As noted, in the rocket modes of operation the injectors 21 inject both fuel and oxidizer. In the other modes where combustion chambers 20 are used, fuel alone is injected.

The multiple cycle propulsion system can operate in all atmospheric (air breathing) and extra-atmospheric (space) environments, defining a universal flight propulsion system. This universal flight propulsion system is the ideal basic propulsion for anti-rocket vehicles. The vehicles propelled by this multiple propulsion system can be launched from all known carriers, naval, air and land operating systems.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A multimode propulsion system designed for subsonic to hypersonic speed in aerial vehicles comprising:
   an engine housing;
   a turbine unit having an air compressor component and a gas expansion component with an exhaust jet discharge, the turbine unit having a rotor axis centered in the housing and a central combustion chamber between the air compressor component and the gas expansion component with a fuel injector means for injecting fuel into the central combustion chamber;
   a convertible associated combustion unit selectively operable in a rocket mode or in ram jet mode in conjunction with the selective operation of the turbine unit, the convertible combustion unit having at least one associate combustion chamber with discrete fuel and elective oxidizer supply means for injection of fuel in the ram jet mode and injection of fuel and an oxidizer in the rocket mode, wherein the housing has an intake passage through the housing communicating with the associate combustion chamber and means for opening the intake passage and passing ram air to the associate combustion chamber during the ram mode and blocking the intake passage to the combustion chamber during the rocket mode.

2. The multimode propulsion system of claim 1 having further valve means for selective communication between the central combustion chamber and the associate combustion chamber wherein in a parallel combustion mode, the valve means are in an open position and combustion gases pass from the central combustion chamber to the associate combustion chamber and fuel is ejected from the fuel and oxidizer supply means, mixed with the combustion gases and combusted.

3. The multimode propulsion system of claim 2 wherein the means for opening the intake passage passes air to the associate combustion chamber.

4. The multimode propulsion system of claim 1 wherein the convertible associated combustion unit is operable alone without the conjunct operation of the turbine unit.

5. The multimode propulsion system of claim 1 wherein the convertible associated combustion unit is operable in parallel with the conjunct operation of the turbine unit.

6. The multimode propulsion system of claim 1 wherein the turbine unit is centrally located in the housing and the convertible associated combustion unit has four discrete combustion components uniformly arranged around the central turbine unit with four directionally variable exhaust discharge nozzles arranged around the exhaust jet discharge of the turbine unit.

* * * * *